Patented July 10, 1951

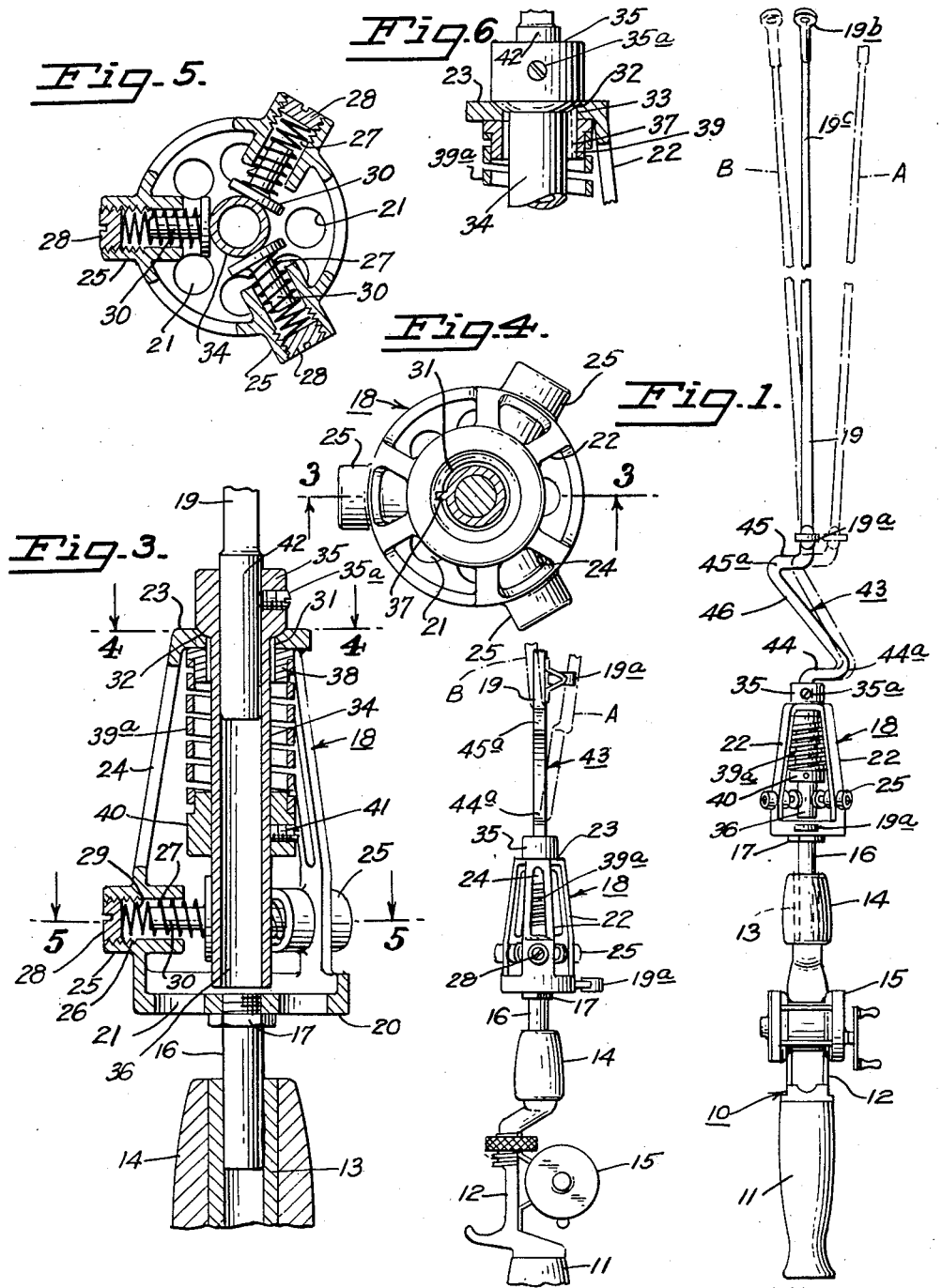

2,559,933

UNITED STATES PATENT OFFICE 2,559,933

FISHING ROD WITH RESILIENT PIVOTAL BUTT END

Damond E. Briney, Natalia, Tex.

Application July 22, 1948, Serial No. 40,179

10 Claims. (Cl. 43—18)

This invention relates to fishing rods and more particularly to fishing rods particularly adapted to bait casting.

Bait casting rods have an essential difference from fly casting rods in that the average fly is of very light weight, and consequently does not have a large amount of momentum at the free tip end of a rod induced by the arcuate swing of the end tip in the casting operation. Therefore, fly casting rods are generally very long, slender and resilient, and because the effect of the resilience cannot be determined, it is difficult to determine with reasonable accuracy where a fly will alight upon the water. Also, long resilient rods are difficult to use under conditions along streams which have trees and bushes lining the banks, because the tip of the rod and the line require a considerable amount of space for manipulation. Further, if a heavier weight is imposed at the end of the tip, such as a bait in baitcasting, the slenderness of a long flexible rod causes an excess vibration at the end tip which jerks the bait backward upon rebound of the tip of a slender flexible rod, due to the impelled force of casting.

An object of the present invention is to provide a fishing rod in which the rod portion from the handle grip to the free end or tip is relatively short and relatively stiff as compared to the length and flexibility of the well-known fly casting rod.

Another object is to provide auxiliary resilience in a relatively stiff baitcasting rod.

A further object is to provide, in a relatively stiff baitcasting rod, means for permitting the rod to flex upon making a cast of bait, and for snubbing the rebound of the tip of the rod on the recoil of the thrust of casting.

A further object is to provide a novel spring means in a fishing rod for adjusting the resilience of the rod adjacent the handle grip portion, and to provide adjacent such spring means a member flexible only upon exertion of greater applied force than is necessary to flex the spring member.

One form in which the invention may be exemplified is described herein and illustrated in the accompanying drawing, in connection with which the accomplishment of the foregoing and other objects will be apparent or further explained, it being understood that changes of minor details, by substitution of equivalents may be resorted to without departing from the spirit and scope of the invention which is defined in the appended claims.

In the accompanying drawing:

Fig. 1 is a plan view of the fishing rod of the invention, and showing in dot and dash lines a flexed position of the rod.

Fig. 2 is a fragmentary side view of a portion of the rod of Fig. 1.

Fig. 3 is an enlarged transverse vertical section on line 3—3 of Fig. 4.

Fig. 4 is a horizontal transverse section on line 4—4 of Fig. 3.

Fig. 5 is a horizontal transverse section on line 5—5 of Fig. 3.

Fig. 6 is an enlarged vertical section of a portion of apparatus of Fig. 3.

Referring to the drawing in which like reference characters indicate corresponding parts in the several views, 10 indicates generally any suitable handle for mounting at the butt end of the fishing rod. Many types of handles are well known and, as herein illustrated by way of example, may consist of a terminal hand grip 11 which is employed as the grip handle for casting, an adjoining axially offset reel seat 12 and a tubular neck 13, axially aligned with the hand grip. An auxiliary tubular forward hand grip 14 may surround the tubular neck, and is used more frequently as the hand grip when reeling in the line, whether with or without a fish having been caught. Obviously the reel seat is for mounting a reel 15.

The recess of the tubular neck of the handle receives therein one end of a stub rod 16 coaxial with the hand grip members. The opposite end of the stub rod is provided with a seat 17 for supporting securely thereon the base end of a cage 18 which latter includes means to resiliently support the butt end of a main rod portion 19.

The cage 18 comprises a skeleton frame having a base plate 20 preferably circular in plan and securely seated centrally upon the seat 17 of stub rod 16. The base plate may have a suitable number of openings 21 therein, but these are merely to decrease weight and have no other function.

Extending upwardly from the circumference portion of base plate 20 are a plurality of integral side wall plates 22, three being illustrated as satisfactory for operation. The side wall plates are relatively spaced circumferentially so that other mechanism within the cage may be inserted through the spaces therebetween. The side wall plates are inclined inwardly from bottom toward a cage top 23 to which they are integrally connected, the top obviously being smaller than the base plate due to the inward incline of the side plates.

The side wall plates, at their upper portions, may have elongated openings 24 which are to lighten weight but serve no other function. The portion of the side wall plates adjacent the base plate are solid and each plate is provided in said lower solid portion with a transverse tubular nipple 25 which extends through the side wall plate both radially outwardly and radially inwardly relative to the longitudinal axis of the cage. The outwardly extended part of each nipple is internally threaded as at 26, while the opposite or inward extended portion is preferably a smooth bore, as at 27, the outward open end of the nipple being closable by a complementally threaded plug 28. Within each tubular nipple is mounted a compression coil spring 29, and the longitudinal center opening of the coils receive therein the stub shank of a headed plunger 30, the head being urged by the spring radially inwardly relative to the cage axis. Three of such plunger members are provided herein relatively spaced at approximately 120°.

The top 23 of the cage has a central opening 31 providing a concave ball seat 32, the wall of the opening having a key slot 33. Through the top opening 31 is mounted the butt end portion of the main rod 19 which has a shoulder for seating on the ball seat 32 to provide a universal pivotal seat for the rod, whereby the butt portion within the cage is movable laterally against spring tension means within the cage. While the butt end of the rod and including that portion within the cage may be made integral, it is here illustrated and described in a preferred form as a tubular socket member 34, so that if desired, the butt of various types of main rods may be interchanged therein to suit the desires of a particular individual or meet special fishing conditions. As here illustrated and described, the socket member 34 is provided with a head 35 having at one end a rounded shoulder to seat for universal pivotal oscillation upon the ball seat 32 of the cage top, the socket having a lower end tubular extension 36 which is of a length so that the opposite end thereof is adjacently spaced from and free of the inner face of the base plate 20 of the cage. The lower end of the socket member which by reason of its connection to the main rod is an axially aligned continuation thereof, is adapted to be engaged in contact between the opposed faces of the three heads of the spring tensioned plunger members 30 whereby the free end of the socket member may wobble or move universally laterally in any direction against the spring tension of the plunger members. The socket member 34 is provided adjacent its head with an axially longitudinal key 37 loosely and slidably fitting into the key slot 33 of the cage top whereby the socket member 34 and the butt end of the main rod are maintained against axial rotation relative to the cage. It is to be understood that the engagement of the socket member in the top opening 31 is a loose fit so that the socket member may wobble on its pivotal ball seat.

Means are provided within the cage for holding the socket member therein and cooperating with the spring tensioned plunger members to provide an auxiliary spring tension to the lateral movement of the socket portion which is within the cage and holds the butt end of the rod. This means includes a collar 38 abutting the underface of the cage top and having a central opening to receive loosely therethrough the socket member 34, and being also provided with a key slot 39 which will underlie the key slot 33 of the cage top, and likewise receive therein the key 37 of the socket member. The collar 38 is provided with a shoulder to receive thereagainst one end of a coil spring 39a mounted circumferential of and spaced from the socket extension portion within the cage. The opposite end of the spring bears on the shoulder of a second collar member 40, slidable on the extension 36 of the socket member, and having a set screw 41 whereby the tension of the spring 39a may be adjusted by movement of the collar and securing it by the set screw.

The tube of socket member 34 receives interchangeably at its open or head end the butt 42 of the main rod portion 19 which is releasably secured therein by a set screw 35a.

Adjacent its mounting at the top of the cage the butt end portion of the main rod portion 19 is integrally laterally deformed from axial alignment to produce in said butt end portion closely adjacent to the spring tension means a substantial rigidity which flexes responsive to applied force of casting but is non-flexing responsive to the rebound flexing or vibration of the tip end portion of the rod beyond the deformed member. As herein exemplified in preferred form, such deformation from axial alignment comprises a Z-shaped member generally indicated 43 which, when viewed from a side edge, lies substantially within one axial longitudinal plane of the rod, as shown in Fig. 2, but provides lateral offsets from the rod axis in a plan view perpendicular to the side edge, as shown in Fig. 1. The Z-shaped member comprises lateral arms 44 and 45 and diagonal crossbar 46 therebetween. The arms 44 and 45 extend laterally to opposite sides of the rod axis, the ends thereof which connect the respective arms with the axial aligned portion of the rod, and also the center of the diagonal crossbar 46 of the Z-shaped member, being substantially axially aligned with the main rod portion, and with the socket, the cage and the hand grip. The lateral offset of the opposite Z arms 44, 45 is substantially equal on either side of said rod axis. The lateral arms and diagonal crossbar of the Z member are substantially rigid in the length of each such member, but the angles 44a and 45a therebetween have a degree of flexure, though not a resilience such as exists in the lateral resilience of the spring tension means within the cage, such flexure at said angles being both in the plane of the Z member by opening of said angles, and also transversely perpendicular thereto by torque at said angles.

At the end of the deformed portion or Z member which is more remotely removed from the cage, is the axial length of the major portion of the main rod 19, designated as tip portion 19c, carrying spaced guides 19a and a tip end guide 19b, the axial length of this major or tip portion of the main rod being relatively short and stiff as compared to the length and flexibility of a fly-casting rod, preferably being 2 to 3 feet in length.

It is to be noted that a purpose of the invention is to provide a short relatively stiff rod which will flex responsive to applied force of the arcuate arm movement in making a cast, but which will have its resilient rebound snubbed or absorbed so that the tip portion of the rod is brought to rest or ceases to vibrate immediately after its first return reflex from the original applied force of casting. For that purpose the deformed portion or Z member is neither absolutely rigid nor is it freely flexible. It has flexure at its angles responsive to the applied force of the throw in making a cast, but is substantially rigid responsive to the reflex or rebound of the tip portion of the rod immediately following the cast. For this reason, in making a cast with the rod, the applied force of casting is effective to flex the rod its entire length from the terminal tip of the rod through the deformed portion and into the butt portion which is engaged in the springs 39a, as indicated by dash lines A in Fig. 1. But on the reflex or rebound of the rod, when no applied force is present, the quiver or vibration of the tip portion 19c ceases at its connection of the tip portion to the substantially rigid deformed member and is not transmitted to the butt portion nor to the spring means within the cage 18 nor to the handgrip, as is indicated on the tip by strike of a fish, the vibration is transmitted through the entire length of the rod and thus to the handle member. While it is preferred in use of the rod that casting be done so that the rod will flex in the plane of the plan view of Fig. 1, in actual practice it has been demonstrated that the Z member flexes in the same manner by torque at its angles 44a and 45a if the casting or fishing operation be carried on with the flexing of the Z member in a plane perpendicular to the plan view, as shown by broken lines in Fig. 2. The theory, which appears to be most probable at least, is that by interrupting the continuity of axial alignment of the rod portion by a deformed member, regardless of its shape, which has portions offset equally on both sides of the axis of the rod, and has flexure responsive to applied force only and not to the force of rebound quiver of the tip, causes a balanced flexure substantially evenly upon application of applied force such as in casting, and will absorb the rebound quiver of the tip evenly in the deformed member without unbalancing the rod from axial alignment or transmitting the rebound quiver to the handgrip. From a long period of experiment it has been determined that for all purposes a Z-shaped interruption of the axial alignment of the main rod portion is the most effective and efficient, and it has therefore been expressed as the preferred form.

In operation, it is to be understood that in casting with a fishing rod, it is well known that there is a backward arcuate swing of the tip end of the rod responsive to the applied force of manual manipulation at the hand grip end. This backward arcuate swing at the tip of the rod causes a long resilient rod to reflex forwardly quite extensively at the tip end in the direction of the throw or cast when the manual force of the throw ceases. At the limit of its forward flexing the rod tip rebounds reversely or rearwardly due to the inherent flexibility of the rod, and there may follow several oscillations of minor flexing until the vibration ceases. At times these reflexes of the end of the rod tip occur while the bait, fly, or spoon are in transit in the air and frequently prevent the bait, spoon or even a fly, from striking the water in an intended area, and often cause the bait, etc., to be jerked rearwardly after landing on the water. Due to auxiliary spring means of the invention, the rod may be quite stiff and since it does not depend on the length and thickness of the rod for litheness and resilience, it may be made relatively short, so as to be adaptable to use along streams where underbrush and overhanging trees and bushes interfere with manipulation of a long resilient rod. Upon the normal throw of the arm and rod rearwardly in the initial movement of making a cast, there is practically no independent resilient vibration at the tip end, due to the shortness and stiffness of the rod, yet when the rod is manually propelled forwardly by applied manual force of arm movement, there is sufficient flexing of the Z member, the coil spring, and the spring tensioned plunger members, to prevent the tip of the rod from coming to a sudden stop in its arc of movement, and the cast bait, spoon, or even a fly, may be directed to alight upon the water lightly and more nearly at a predetermined spot. The Z-member which is substantially transverse to the plane of the rebound force, provides substantially no acceleration of the rebound of the rod, while the coil spring which may be adjusted to any reasonable degree of tensioned resistance, snubs the effect of the recoil of the rod, supplemented by the compression of the springs of the plunger members against which the lower end 36 of the rod-holding socket member contacts.

In event of a strike by a fish, the resilient means within the cage, and also the Z-member at its angles flex proportionately to the force of pull on the tip of the rod, the rigid crossbar 31 resiliently absorbing by torque between the angles a large portion of stress which would otherwise be transmitted solely to the spring means, whereby the Z member acts as a stabilizer of the rod during play of the line in the guides. The main rod portion 19 being short and relatively stiff, there is not the wide arc of resilient swing at the end of the rod which is prevalent in a long thin flexible rod and which so often permits a fish to unhook itself when the line goes slack by reason of the change of direction or run of the hooked fish.

Thus a short stiff rod has been provided adaptable to use in underbrush, and wherein the oscillation at the tip of the rod is substantially eliminated, and also wherein the manual thrust which normally produces a decided rebound, is absorbed on the rebound by the snubbing action of the Z member and resilient spring means.

Although the operation of assembly of the parts is believed to be apparent, it will be noted that the coil spring 29 in the tubular nipples may be inserted and tensioned by the plugs 28. The spaces between the side plates of the cage are sufficiently wide to permit the plungers 30 to be inserted into the cage and the shanks thereof into the center of the coil springs in the nipples. Also the spaces between the side plates permit the coil spring 39a and its collars to be inserted within the cage; and the opening 31 in the top of the cage permits the tubular portion of the socket member 34 to be inserted therethrough, and through the central opening of the axial spring and collars, whereupon the desired tension of the coil spring may be accomplished by adjustment of the lower collar by set screw 41. In such assembly the lower end of the socket member is engaged between the heads of the tensionally opposed plunger members whereby the lower free end 36 of the socket member and the main rod therein, are normally held axially aligned with the handle, subject, however, to flexing against spring resistance in the manner set forth.

Having thus described the invention, what is claimed as new and patentable is:

1. A fishing rod of the character described, including a main rod having a butt end portion adapted for attachment to a hand grip and reel seat member, universal pivotal means spaced adjacently to the butt end of the main rod for mounting the said butt end portion universally pivotally, and resilient spring means engaging the rod between the universal pivotal mounting and the terminal of its butt end for spring tensioning movement of the rod on said pivotal mounting.

2. In a fishing rod of the character described, a main rod having a butt end portion adapted for attachment to a hand grip and reel seat member, means spaced adjacently to the butt end of the main rod for mounting the said butt end portion universally pivotally, and resilient spring means engaging the rod between the pivotal mounting at the terminal of its butt end for spring tension movement of the rod on said pivotal mounting, said rod having an integral portion adjacent the pivotal mounting laterally offset in opposite directions from the axis of the rod, the connecting ends of the offset being in axial alignment with the main rod.

3. In a fishing rod of the character described, a main rod having a butt end portion provided with a ball shoulder spaced from the terminal end thereof, a cage member having a top opening for receiving the butt end portion of the rod therethrough, said opening having a ball seat for universal pivotal mounting thereon of said ball shoulder, and spring tension means at the opposite end of the cage adapted to resiliently contact the side wall of the rod below said pivotal mounting for tensioning the terminal end portion of the rod against lateral movement.

4. A fishing rod including a main rod having a butt end portion adapted for attachment to a hand grip and reel seat member, means spaced adjacent to the butt end of the main rod for mounting the said butt end portion pivotally, and resilient spring means engaging the rod between the pivotal mounting and the terminal of the butt end for spring tensioning movement of the rod on said pivotal mounting, said rod having an integral Z-shaped portion adjacent the pivotal mounting, the connecting ends of which are in axial alignment with the main rod and each of which extends laterally outwardly in an opposite direction from said axis.

5. In a fishing rod, a main rod having a butt end portion adapted for attachment to a hand grip and reel seat member, means spaced adjacently to the butt end of the main rod for mounting the said butt end portion pivotally, and resilient spring means engaging the rod between the pivotal mounting and the terminal of its butt end for spring tensioning movemet of the rod an said pivotal mounting, including a coil spring member axially aligned with the major portion of the rod and the hand grip, said coil spring being secured around said rod beneath said pivotal mounting, and spring means below the axial spring for tensioning the terminal end portion of the rod against lateral movement.

6. A fishing rod comprising a main rod having a butt end portion adapted for attachment to a hand grip and reel seat member, universal pivot means spaced adjacently to the butt end of the main rod for mounting the said butt end portion universally pivotally, including a cage member having a top opening for receiving the butt end portion of the rod therethrough, and spring tension means at the opposite end of the cage adapted to resiliently contact the side wall of the rod below said universal pivotal mounting for tensioning the terminal end portion of the rod against lateral movement.

7. In a fishing rod of the character described, a main rod having a butt end portion adapted for attachment to a hand grip and reel seat member, and provided with a ball shoulder spaced from the terminal end thereof, a cage member having a top opening for receiving the butt end portion of the rod therethrough, said opening having a ball seat for pivotal mounting thereon of said ball shoulder, an axially aligned coil spring member secured around said rod beneath said pivotal mounting, and spring tension means at the opposite end of the cage adapted to resiliently contact the side wall of the rod below said axial spring for tensioning the terminal end portion of the rod against lateral movement.

8. A fishing rod comprising a main rod having a butt end portion adapted for attachment to a hand grip and reel seat member, means spaced adjacently to the butt end of the main rod for mounting the said butt end portion pivotally, resilient spring means engaging the rod between the pivotal mounting and the terminal of its butt end for spring tensioning movement of the rod on said pivotal mounting, spring tensioned means below the pivotal mouting for tensioning the terminal end portion of the rod against lateral movement, the said rod having an integral portion adjacent the pivotal mounting offset laterally in opposite directions from the axis of the rod, the connecting ends of which are in axial alignment with the main rod.

9. In a fishing rod of the character described, a main rod having a butt end portion provided with a ball shoulder spaced from the terminal end thereof, a cage member having a top opening for receiving the butt end portion of the rod therethrough, said opening having a ball seat for pivotal mounting thereon of said ball shoulder, and spring tensioned means below the pivotal mounting for tensioning the terminal of the butt end of the rod against lateral movement, said rod having an integral portion adjacent the pivotal mounting offset in opposite directions laterally of the axis of the rod, the connecting ends of which are in axial alignment with the main rod.

10. A fishing rod including a main rod portion having a butt end portion adapted for attachment to a hand grip and reel seat member, said rod having an integral portion adjacent the butt end deformed in opposite directions from the axis of the rod, whereby continuity of axial alignment is interrupted in said rod, the connecting ends of the deformed portion being in axial alignment with the major portion of the main rod, universal pivotal seat means adjacent the butt end of the rod for mounting the rod universally pivotally to a handle member, and spring means between said pivotal seat and terminal of the butt end of the rod for spring tensioning lateral movement of said butt end.

DAMOND E. BRINEY.

REFERENCES CITED

The following references are of record in the file of this patent:

UNITED STATES PATENTS

| Number | Name | Date |
| --- | --- | --- |
| 1,513,567 | Swihart | Oct. 28, 1924 |
| 2,182,423 | Cabassa | Dec. 5, 1939 |
| 2,351,734 | Backe | June 20, 1944 |
| 2,483,071 | Stine | Sept. 27, 1949 |